(12) United States Patent
Klemm et al.

(10) Patent No.: US 10,634,179 B2
(45) Date of Patent: Apr. 28, 2020

(54) FASTENING DEVICE FOR FASTENING AN OBJECT TO A WALL, AND FASTENING SYSTEM

(71) Applicant: BSH Hausgeräte GmbH, Munich (DE)

(72) Inventors: Jochen Klemm, Sandhausen (DE); Holm Liewke, Bretten (DE); Ulmar Neumann, Forst (DE); Michael Reule, Brühl (DE); Andreas Thumm, Bretten (DE); Peter Zimmermann, Niefern-Öschelbronn (DE)

(73) Assignee: BSH Hausgeräte GmbH, Munich (DE)

( * ) Notice: Subject to any disclaimer, the term of this patent is extended or adjusted under 35 U.S.C. 154(b) by 0 days.

(21) Appl. No.: 15/310,453

(22) PCT Filed: May 27, 2015

(86) PCT No.: PCT/EP2015/061630
§ 371 (c)(1),
(2) Date: Nov. 11, 2016

(87) PCT Pub. No.: WO2015/185396
PCT Pub. Date: Dec. 10, 2015

(65) Prior Publication Data
US 2017/0089381 A1 Mar. 30, 2017

(30) Foreign Application Priority Data
Jun. 2, 2014 (DE) .......................... 10 2014 210 314

(51) Int. Cl.
*F16B 21/02* (2006.01)
*F16B 12/20* (2006.01)
(Continued)

(52) U.S. Cl.
CPC ............ *F16B 21/02* (2013.01); *F16B 5/0225* (2013.01); *F16B 12/14* (2013.01);
(Continued)

(58) Field of Classification Search
CPC ................................ F16M 13/02; F16B 21/02
(Continued)

(56) References Cited

U.S. PATENT DOCUMENTS

| 944,725 A | * | 12/1909 | Ferguson | .............. | F16B 35/041 |
| | | | | | 411/398 |
| 1,015,890 A | * | 1/1912 | Hyde | .................... | F16B 35/041 |
| | | | | | 411/398 |

(Continued)

FOREIGN PATENT DOCUMENTS

| CN | 2764987 Y | 3/2006 |
| DE | 202012003576 U1 | 8/2012 |

OTHER PUBLICATIONS

International Search Report PCT/EP2015/061630 dated Jul. 20, 2015.
National Search report CN 201580029592.2 dated Dec. 4, 2017.

*Primary Examiner* — Kimberly T Wood
(74) *Attorney, Agent, or Firm* — Michael E. Tschupp; Andre Pallapies; Brandon G. Braun

(57) ABSTRACT

A fastening device for fastening an object to a wall includes a fastening element, a bearing element adapted for bearing against the wall, and a holding element configured to hold at least a part of the object. The holding element has a through opening running at least through the holding element and the bearing element for allowing passage of the fastening element. A connecting element constructed as an eccentric connects the bearing element and the holding element to one another. The holding element together with the connecting element and the bearing element form a single-piece fastening unit.

18 Claims, 3 Drawing Sheets

(51) Int. Cl.
  *F16B 12/14* (2006.01)
  *F16B 43/00* (2006.01)
  *F16B 5/02* (2006.01)
  *F16M 13/02* (2006.01)
(52) U.S. Cl.
  CPC ...... *F16B 12/2009* (2013.01); *F16B 12/2027* (2013.01); *F16B 43/009* (2013.01); *F16M 13/02* (2013.01)
(58) Field of Classification Search
  USPC .............. 411/398, 169; 280/86.753; 403/350
  See application file for complete search history.

(56) References Cited

U.S. PATENT DOCUMENTS

| | | | | |
|---|---|---|---|---|
| 1,044,055 A * | 11/1912 | Johnson et al. | .... | E05D 11/1078 16/242 |
| 1,213,599 A * | 1/1917 | Dow | .................. | F16B 33/002 200/49 |
| 2,074,393 A * | 3/1937 | Hixon | .................. | H01R 4/5008 403/350 |
| 2,430,613 A * | 11/1947 | Hodge | .................. | B25B 5/08 101/386 |
| 2,525,217 A * | 10/1950 | Glitsch | ................ | F16B 5/0642 261/114.5 |
| 2,569,914 A * | 10/1951 | Appleton | ............. | E05B 65/006 220/245 |
| 2,638,276 A * | 5/1953 | Stamm | ................... | E01B 9/486 238/349 |
| 3,747,168 A * | 7/1973 | Snarskis | ................. | F16B 5/025 411/349 |
| 3,956,803 A * | 5/1976 | Leitner | .................. | F16B 19/02 411/349 |
| 4,372,015 A * | 2/1983 | Rhoton | ................... | F16B 5/025 24/453 |
| 4,509,882 A * | 4/1985 | Lautenschlager, Jr. | ..................... | F16B 12/2027 403/231 |
| 4,604,079 A * | 8/1986 | Parrish | ...................... | F16H 7/14 248/666 |
| 4,659,133 A * | 4/1987 | Gower | ................... | B60R 13/01 296/39.2 |
| 5,246,322 A | 9/1993 | Salice | | |
| 5,346,349 A * | 9/1994 | Giovannetti | ............ | F16B 13/08 403/350 |
| 5,964,011 A * | 10/1999 | Ruston | .................. | E05D 7/0054 16/239 |
| 6,997,658 B2 * | 2/2006 | Fly | ............................ | B25B 5/08 24/458 |
| 7,144,184 B1 * | 12/2006 | Tsai | ..................... | F16B 7/0486 403/350 |
| 7,213,346 B1 | 5/2007 | Gregory | | |
| 8,388,291 B2 * | 3/2013 | Rogers | ................... | F16B 21/02 24/453 |
| 8,465,221 B2 * | 6/2013 | Yan | ...................... | H05K 7/1489 248/220.22 |
| 2009/0019667 A1 * | 1/2009 | Lautenschlager | .... | A47B 95/008 16/242 |
| 2010/0129149 A1 * | 5/2010 | Metz | ................... | F16B 12/2027 403/409.1 |

\* cited by examiner

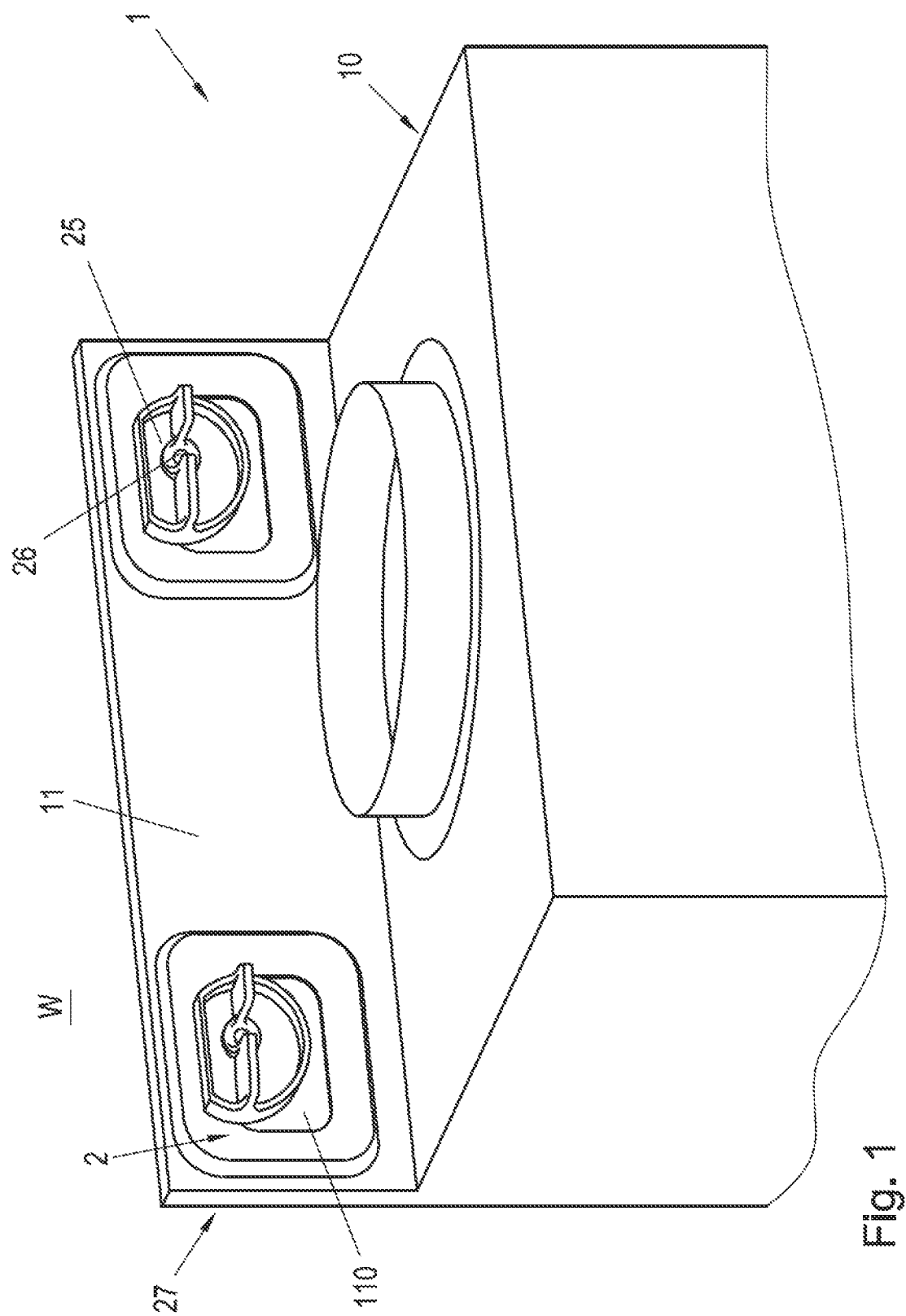

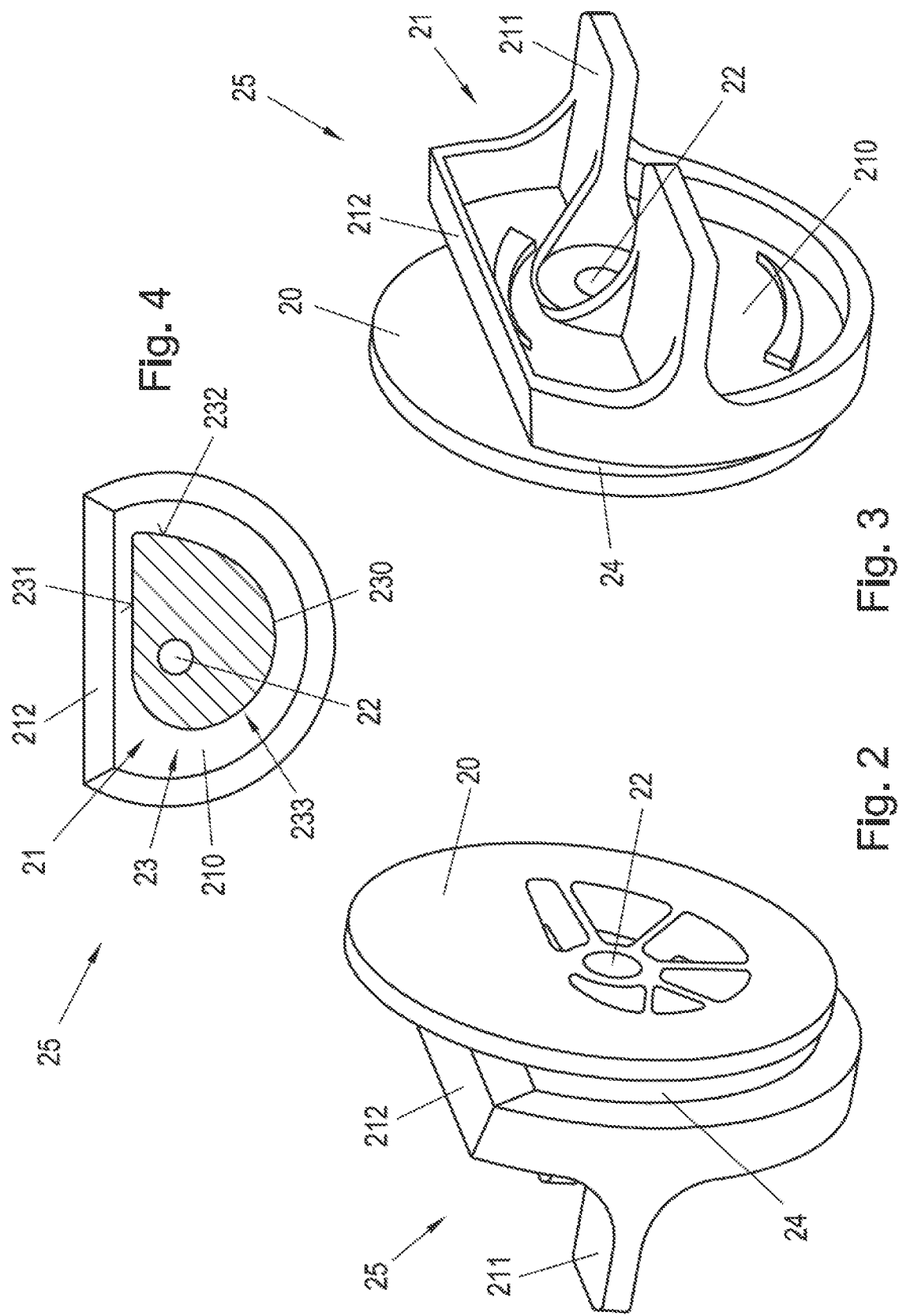

FASTENING DEVICE FOR FASTENING AN OBJECT TO A WALL, AND FASTENING SYSTEM

CROSS-REFERENCES TO RELATED APPLICATIONS

This application is the U.S. National Stage of International Application No. PCT/EP2015/061630, filed May 27, 2015, which designated the United States and has been published as International Publication No. WO 2015/185396 A1 and which claims the priority of German Patent Application, Serial No. 10 2014 210 314.2, filed Jun. 2, 2014, pursuant to 35 U.S.C. 119(a)-(d).

BACKGROUND OF THE INVENTION

The present invention relates to a fastening device for fastening an object to a wall and a fastening system comprising such a fastening device.

When fastening objects to a wall, it is generally necessary to connect, in other words fasten, the object to the wall at more than one point. Normally objects are fastened to a wall at two points. One problem with this type of fastening is that reliable horizontal alignment of the object due to differing heights of the fastening points, also referred to as screw points, cannot be excluded. Any height offset between the fastening points can be compensated for by using a fastening device with an eccentric. Such a fastening device is described for example in EP 2 145 133 B1. This fastening device consists of a pin, an eccentric arranged in such a manner that it can be twisted on the pin and a cap for fastening with a form and/or force fit to the eccentric. The cap protects the object.

One disadvantage of such fastening devices is that fastening is complex and there is a risk that the object, in particular a heavy object, may drop off during fastening.

BRIEF SUMMARY OF THE INVENTION

It is therefore the object of the present invention to create a solution which allows reliable fastening of an object to a wall in a simple manner.

The invention is based on the knowledge that said object can be achieved by minimizing the number of steps required to secure the object in a protected manner.

According to a first aspect the invention therefore relates to a fastening device for fastening an object to a wall, having a fastening element, a bearing element for bearing against a wall for fitting and a holding element at least for holding at least part of the object as well as a through opening running at least through the holding element and the bearing element to allow passage of the fastening element. The fastening device is characterized in that the bearing element and the holding element are connected to one another by way of a connecting element, the holding element, the connecting element and the bearing element together form a single-piece fastening unit and the connecting element is an eccentric.

According to the invention a fastening device is a device which can be used to fasten an object to a wall. According to the invention the fastening device consists of a fastening element and a fastening unit, by means of which the fastening element is passed through the through opening. Fastening here takes place by way of the fastening element, which interacts with the fastening unit of the fastening device. The fastening element is an element which is partially introduced into the wall. The fastening element is preferably a screw. According to the invention the part of the fastening element that projects beyond the wall serves to support the fastening unit of the fastening device, in particular to support the fastening unit of the fastening device in such a manner that it can be rotated at least intermittently. The fastening element has a length that is greater than the depth of the fastening unit and therefore the length of the through opening. The fastening element particularly preferably has a head, in particular a screw head, the diameter of which is greater than the diameter of the through opening.

The object that can be fastened to the wall by means of the fastening device can be a furniture unit, for example a cabinet. However the object is preferably an extractor hood. In the case of extractor hoods in particular it is important for visual reasons and also for correct operation that the extractor hood and in particular the housing of the extractor hood is fastened with precise horizontal alignment. The wall is preferably a room wall but it can also be a different wall, for example a panel wall or unit wall.

The fastening unit of the inventive fastening device comprises a bearing element for bearing against a wall for fitting. The bearing element can also be referred to as a bracing element and is preferably a plate or disk. The shape of the bearing element is not restricted to a specific shape. The bearing element can therefore have a round or angular shape for example. The bearing element can also have the shape of the cross section of the connecting element. In the simplest instance therefore the bearing element can be the face of the connecting element facing away from the holding element.

In addition to the bearing element the fastening unit of the fastening device comprises a holding element. According to the invention the holding element serves at least to engage with at least part of the object. To engage here means in particular to prevent movement of the object in the longitudinal direction of the fastening device, in other words in the longitudinal direction of the fastening element. Engaging with at least part of the object means that the object as a whole is held on the fastening device. According to the invention the holding element can also have further functions in addition to engaging with part of the object, as described in more detail below. The part of the object with which the holding element engages is preferably a region of an edge of the object. In particular the part of the object with which the holding element engages is preferably a region of a receiving opening in a receiving region of a rear wall of the object or in a receiving region connected to the rear wall.

According to the invention a through opening to allow the passage of the fastening element is provided in the fastening device. The through opening extends at least through the holding element and the bearing element. When the object is in the fastened state, at least part of the fastening element is still in the through opening.

According to the invention the bearing element and the holding element are connected to one another by way of a connecting element. In particular the connecting element is located between the holding element and the bearing element. According to the invention the through opening for the fastening element also extends through the connecting element. The dimensions of the connecting element in the directions perpendicular to the axis of the through opening are preferably smaller than the dimensions of the bearing element and the holding element in said directions. At least however the dimension of the connecting element perpendicular to the axis of the through opening is smaller than the support for the holding element in said direction. In contrast according to one embodiment the dimension of the bearing element can correspond to the dimension of the connecting element. The bearing element then forms the end of the connecting element facing away from the holding element, in particular the end face of the connecting element facing the wall.

The holding element, the connecting element and the bearing element together form a single-piece fastening unit. These three parts of the fastening device are thus configured as a prefabricated unit. The three parts are particularly preferably connected non-detachably to one another. A single-piece fastening unit here is a unit which is combined or formed into a unit before attachment to the wall, its regions being connected to one another inseparably in the combined or formed state. The regions can preferably also be generated during production of the unit. This means that the elements, in other words the holding element, the bearing element and the connecting element, are simply regions of a single-piece component and are not produced as separate components and then connected together. For example the three elements can be present as regions of a single injection-molded part.

According to the invention the connecting element is an eccentric. An eccentric here is a body, the lateral surface of which is at different distances from the axis of the body over the periphery of the body. The axis of the connecting element is formed by the through opening, into which the fastening element is inserted. The through opening of the fastening device is thus provided in the connecting element with an offset in relation to the center of the connecting element. As the axes of the through opening and the fastening element are preferably identical, these two axes are referred to in the following simply as the axis of the through opening or the axis of the fastening element. The corresponding details can however be applied to the other axis in each instance.

The fastening unit of the fastening device consisting of bearing element, connecting element and holding element is held in a movable manner on the fastening element. In particular the fastening element can be moved at least over a certain distance in the through opening in the longitudinal direction of the through opening, in particular being inserted into it. The fastening unit can also be rotated about the fastening element at least in one alignment state of the fastening device, in other words during alignment of the object before the final fastening.

Rotation of the fastening unit or elements of the fastening unit always refers in the following, unless otherwise stated, to rotation about the axis of the through opening, which is also referred to as rotation about the axis of the fastening element, rotation about the fastening element or rotation about the through opening.

The fact that the bearing element, the holding element and the connecting element are configured as a single-piece fastening unit in the inventive fastening device, in other words they form a single component, simplifies the fastening of the object to the wall. In particular the holding element prevents the object moving in the longitudinal direction of the through opening of the fastening device. As the holding element is connected to the connecting element and the bearing element to form a unit, there is no need for separate attachment of the holding element with the present invention. This is particularly advantageous when fastening heavy objects, such as an extractor hood for example, as the user generally has to bear the weight of the object and rapid fastening is therefore desirable.

Also because the connecting element is an eccentric, it is easy to compensate for any height offset. To do this with the present invention it is only necessary to rotate one component, specifically the fastening unit consisting of bearing element, holding element and connecting element. As the single-piece configuration means that the holding element is also rotated during such a twisting operation, the securing of the object can be improved if the holding element has an appropriate geometry.

Direction data such as front or rear, or front face and rear face, unless otherwise specified, relate to the state of the fastening device when it is fastened to the wall, the face facing the wall being the front face.

According to the invention the eccentric can have a round cross section. According to one preferred embodiment however the eccentric is a spiral eccentric. Within the meaning of the invention a spiral eccentric is a body, wherein the distance between the axis of the body and the periphery increases over an angular region of more than 180°. In the connecting element the axis is defined by the through opening. The distance between the through opening and the periphery of the connecting element determines the distance the object with the part resting on the connecting element is above the fastening element. Because this distance can be increased over an angular region of more than 180°, it is possible to set the height of the object precisely. The elevation per degree of rotation is also small, so setting forces can also be smaller.

A further advantage of the use of a spiral eccentric is that the highest point of the eccentric is above the through opening and therefore above the fastening element in any rotation position in a narrow angular region in relation to the perpendicular. The load point of the connecting element at which the object rests on the eccentric is therefore generally above the screw point. This has the advantage that there is little or no leverage and it is therefore easier to twist the fastening unit even when there is an object resting on it. It also prevents unwanted twisting of the fastening unit due to leverage, in other words the tendency of the fastening unit to twist is greatly reduced.

The periphery of the eccentric, which forms the lateral surface of the eccentric, is also referred to in the following as the elevation curve. The elevation curve preferably has a shape in which a spiral curve adjoins an initial straight line. The end of the spiral curve can be directly at the start of the initial straight line or there can be a further straight line, which can also be referred to as the final straight line, between the end of the spiral curve and the start of the initial straight line. A straight line, in particular an initial straight line or final straight line, in this context also refers to virtual straight lines. A virtual straight line here is a line which is defined by two points and is the shortest connection between said points. The actual profile of the periphery of the connecting element, in particular the eccentric, or the elevation curve has a negatively curved curve profile, also referred to as a concave curve profile, between the two points defining the virtual straight line in this embodiment. With such a virtual straight line the object rests on the eccentric at a corresponding angular position, in other words when the virtual straight line forms the upper face of the eccentric and therefore the object rests on the virtual straight line, only on the two separated points, which can also be referred to as contact points. The concave connection, in other words curved in relation to the axis of the eccentric, between said points is not in contact with the object here. It is also possible for more than two points to define the virtual straight line. Then too however the connection between two adjacent points of the at least three points is a curve running in a concave manner in relation to the axis of the eccentric.

According to one preferred embodiment the eccentric is configured in such a manner that in a perpendicular top view of the through opening of the fastening unit from the rear face of the fastening unit in the counterclockwise direction an initial straight line transitions into a spiral curve, in which the distance between the outer periphery of the eccentric and the axis of the through opening increases in the counterclockwise direction.

This embodiment has a number of advantages. On the one hand with such an embodiment any inherent movement of the fastening unit assists fastening by a fastening element that is a screw with a right-hand thread. When there is counterclockwise rotation with such an embodiment, if the highest point of the periphery of the connecting element, in other words of the elevation curve, is not perpendicularly above the axis of the through opening, the highest point is offset to the right of the perpendicular. As a result the inherent weight of an object resting on the connecting element causes inherent pressure from the eccentric to produce rotation in a clockwise direction. As this is the screwing in direction for a screw with a right-hand thread, it assists the connection or prevents the release of the screw connection.

The provision of an initial straight line can also initiate a reliable alignment operation. Also in this position the contact surface between the eccentric and the edge of the object is particularly large, in other words it includes at least two contact points, so it is possible to prevent the object slipping. Rotation of the fastening unit and therefore the eccentric to the left then causes the edge of the object to come into contact with the spiral curve after the initial straight line and the object is raised in relation to the initial position.

According to one preferred embodiment there is a final straight line in the elevation curve between the end of the spiral curve and the start of the initial straight line, said final straight line being angled in relation to the initial straight line and preferably forming an angle smaller than 90° with the initial straight line. The transition between final straight line and initial straight line is preferably a rounded corner. Because the spiral curve transitions into a final straight line, there is also the largest possible bearing surface for the edge of the object on the periphery of the eccentric in the final region, in other words in the region in which the distance between the axis of the through opening and the periphery of the eccentric is greatest. With the embodiment in which the periphery of the eccentric, in other words the elevation curve, transitions tangentially into a surface defined by the final straight line, the rotation resistance is increased and therefore a final stop is generated. This gives the user haptic feedback when the end position, in other words the greatest possible elevation of the object, is reached.

According to one preferred embodiment there is a circumferential gap between the bearing element and the holding element in the region of the connecting element, to receive at least part of the object. This means that both the bearing element and the holding element preferably have a diameter or size that is greater than the largest diameter of the connecting element. Because the gap is circumferential, in other words is present over the entire periphery of the connecting element, the edge of the object is guided during the entire rotation of the fastening unit about the fastening element, thereby further simplifying the fastening of the object.

According to one embodiment the holding element has a shape, whereby the vertical dimension of the holding element is smaller in one angular position than in any other angular position. This embodiment has the advantage that in the angular position with the smallest vertical dimension the holding element can be passed through a receiving opening in or on the object, the height of which corresponds to this smallest dimension. Rotation of the holding element to another angular position, with the associated increase in the vertical dimension of the holding element, then causes at least part of the edge of the receiving opening to be covered by the holding element.

As with the inventive fastening device the holding element is configured as a single piece with the connecting element, the rotation of the fastening element to adjust the height of the object outside the connecting element also causes the holding element to rotate. This automatically protects the object to prevent it becoming detached during adjustment of the height of the object, further simplifying fastening.

According to one embodiment the holding element has the shape of a circle segment, with a center point angle greater than 180°, when viewed in the direction of the axis of the through opening. With this embodiment the holding element therefore has the shape of a circle flattened on one side. It is particularly preferable with such a holding element for the connecting element to be aligned in such a manner that the initial straight line of the elevation curve of the eccentric is parallel to the flattened section. This gives the user of the fastening device a clear indication of where the invisible initial straight line is located. The alignment of the holding element with a circular shape with a flattened section in an angular position in which the flattened section is uppermost is also the preferred alignment for insertion of the fastening unit into a correspondingly large receiving opening, as the vertical dimension of the holding element is smallest with such alignment. Every twist of the fastening unit to align the object above the eccentric therefore causes the object to be protected as a result of the increased vertical dimension of the holding element.

With the embodiment in which the holding element is a flattened circle, the through opening can lie in the center point of the circle. However with such an embodiment the through opening is preferably offset to the side of the center point of the circle. This allows the size of the holding element to be minimized, as the center point can be offset in such a manner that the region of the eccentric, in which the distance between periphery and through opening is greatest, is also still covered by the holding element. This ensures a circumferential gap between the holding element and the bearing element running round the eccentric without unnecessarily enlarging the diameter of the holding element.

According to one preferred embodiment at least one grip element is provided on the holding element, preferably on the front face of the holding element. According to the invention the holding element forms the single-piece fastening unit with the connecting element and the bearing element, the holding element forming the front part of the fastening unit. It is therefore possible to move, and in particular to rotate, the entire fastening unit by way of a force acting on the holding element. The grip element(s) is/are preferably provided on the front face of the holding element and can for example be wings that project forward.

The fastening unit of the fastening device is preferably made of plastic. This makes production of the fastening unit simple, for example using an injection molding process. Alternatively the fastening unit of the fastening device can also be made of aluminum for example or another metal. The fastening unit can be produced by injection or casting for example with this material too.

According to one further aspect the invention relates to a fastening system, which has at least one inventive fastening device. The fastening system is characterized in that the fastening system also comprises a receiving region on the object, in which at least one receiving opening for receiving at least part of the fastening device is provided.

Where applicable, advantages and features described in relation to the fastening system also apply to the inventive fastening device and vice versa.

The receiving region can be part of the object to be fastened or can be connected thereto. The receiving region is preferably part of the rear wall of an object, in particular of an extractor hood and here in particular of the housing of the extractor hood. The receiving region particularly preferably projects beyond the upper face of the object. This allows easy access to the receiving region and therefore to the fastening device to be inserted into the receiving opening.

According to one preferred embodiment the vertical dimension of the holding element of the fastening device corresponds to the height of the receiving opening of the receiving region of the object in one angular position of the fastening unit and in all other angular positions the vertical dimension is greater than the height of the receiving opening.

Angular position here is a rotation position of the fastening device and in particular of the holding element about the axis of the through opening.

The fact that the vertical dimension of the holding element corresponds to the height of the receiving device in this context means that the height of the holding element in the angular position is equal to or smaller than the height of the receiving opening. In all other angular positions the vertical dimension of the holding element is preferably greater than the height of the receiving opening. This configuration allows the holding element to be passed through the receiving opening in one angular position, in particular to be passed through from the rear, and in all other angular positions at least part of the edge of the receiving opening is covered by at least part of the holding element so the object cannot be separated from the fastening device in an unwanted manner.

According to one further embodiment the fastening system also comprises a cap for attaching to the holding element of the fastening device. Such a cap can be attached to the holding element after the angular position of the fastening device has been set. The cap here preferably has a larger diameter than the holding element, thereby further reducing the risk of the object being lifted out.

BRIEF DESCRIPTION OF THE DRAWINGS

The invention is described again in more detail below with reference to the accompanying drawings, in which:

FIG. 1 shows a schematic perspective view of an embodiment of the inventive fastening system;

FIG. 2 shows a schematic perspective rear view of the embodiment of the fastening unit of the fastening system in FIG. 1;

FIG. 3 shows a schematic perspective front view of the embodiment of the fastening unit of the fastening system in FIG. 1;

FIG. 4 shows a schematic cross-sectional view of the embodiment of the fastening unit in FIGS. 2 and 3;

DETAILED DESCRIPTION OF EXEMPLARY EMBODIMENTS OF THE PRESENT INVENTION

Figure 6:
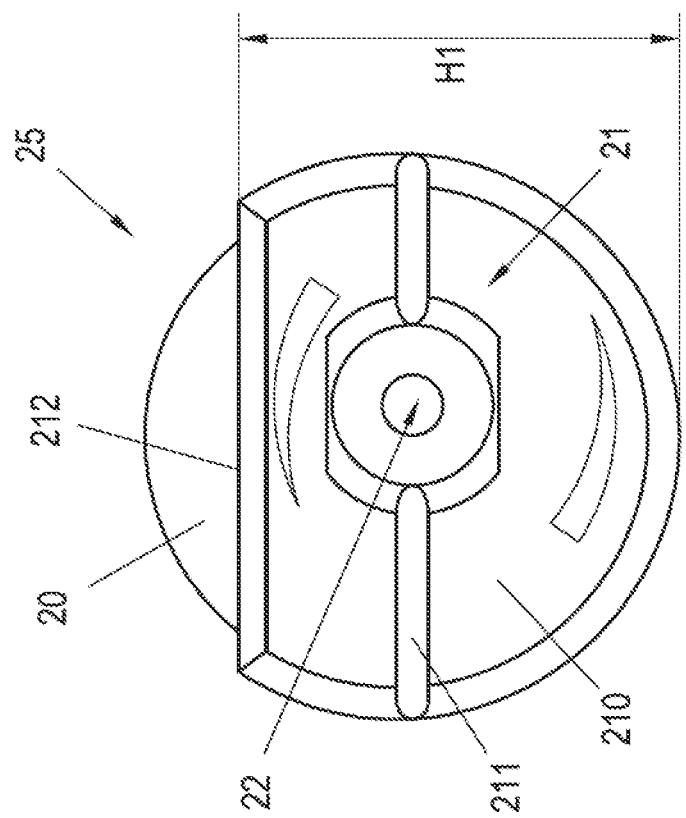
FIG. 6 shows a schematic front view of the embodiment of the fastening unit in FIGS. 2 and 3.

FIG. 1 shows an embodiment of the fastening system 27 according to the present invention. The object fastened to the wall W by means of the fastening system is an extractor hood 1, in particular the housing 10 of the extractor hood 1, in FIG. 1. The upper part of the rear wall of the housing 10 of the extractor hood 1 forms a receiving region 11, in which receiving openings 110 are provided. In the illustrated embodiment the receiving region 11 is therefore connected in a fixed manner to the object, specifically the extractor hood 1, in particular the housing 10 of the extractor hood 1, and forms a part thereof. The receiving region 11 projects beyond the upper face of the housing 10 of the extractor hood 1.

Two receiving openings 110 are introduced into the receiving region 11. The receiving openings 110 are introduced in the right and left edge region of the receiving region 11 respectively. The receiving openings 110 have a rectangular cross section, the height of the receiving openings 110 being smaller than their width. A fastening device 2 is introduced into each of the receiving openings. The fastening device 2 consists of a fastening unit 25 and a fastening element 26. In the illustrated embodiment the fastening system 27 therefore comprises two fastening devices 2 and two corresponding receiving openings 110.

FIGS. 2 and 3 show perspective views of the fastening unit 25. The fastening unit 25 consists of a bearing element 20, a connecting element 23 (see FIG. 4) and a holding element 21, which are combined to form a prefabricated unit, and the fastening unit 25 is therefore configured as a single piece. Running through the fastening unit 25 is a through opening 22, which has a round cross section and extends out from the holding element 21 through this, the connecting element 23 and the holding element 21 and is open at the front and rear.

In the illustrated embodiment the bearing element 20 is a circular plate. Cutouts are provided in the plate for manufacture-related reasons. The through opening 22 is introduced in the bearing element 20 with an offset in relation to the latter's center point.

The bearing element 20 is connected to the holding element 21 by way of the connecting element 23. In the illustrated embodiment the holding element 21 has a base plate 210. The base plate 210 has the shape of a circle segment with a center point angle greater than 180°. This means that the base plate 210 and therefore the holding element 21 have the shape of a circle with a flattened section 212. Grip elements 211, which are wings in the illustrated embodiment, extend forward from the base plate 210 of the holding element 21. The holding element 21 also has a frame extending forward from the base plate 210 on the periphery of the base plate 210. In the region of the flattened section 212 of the holding element 21 the frame is angled outward and can therefore serve as an insertion aid. The through opening 22 is also present in the holding element 21 with an offset in relation to the center point of the flattened circle.

The connecting element 23 of the fastening unit 25 is now described in more detail with reference to FIG. 4.

The connecting element 23 is a body with a longitudinal extension between the rear face of the holding element 21 and the front face of the bearing element 20. The cross section of the connecting element is designed eccentrically in relation to the through opening. The connecting element 23 therefore forms an eccentric. In the preferred embodiment shown in FIG. 4 the eccentric is a spiral eccentric. In the view of the connecting element 23 from the rear in the direction of the through opening 22 the periphery of the connecting element 23 therefore forms an elevation curve 230 with the following regions. Parallel to the flattened section 212 of the holding element 21 the upper face of the connecting element 23 is configured as a straight line, referred to in the following as the initial straight line 231. At the left end of the initial straight line 231, in other words in the counterclockwise direction, a spiral curve 233 adjoins the initial straight line 231. Over the course of the spiral curve 233 the distance between the periphery of the connecting element 23 and the through opening increases counterclockwise. After an angular region greater than 180°, in the illustrated embodiment for example after 225°, the spiral curve 233 transitions into a final straight line 232. The final straight line 232 and the initial straight line 231 here are at an acute angle to one another and the end of the final straight line 232 is connected to the start of the initial straight line 231 by way of a rounded section.

Figure 5:
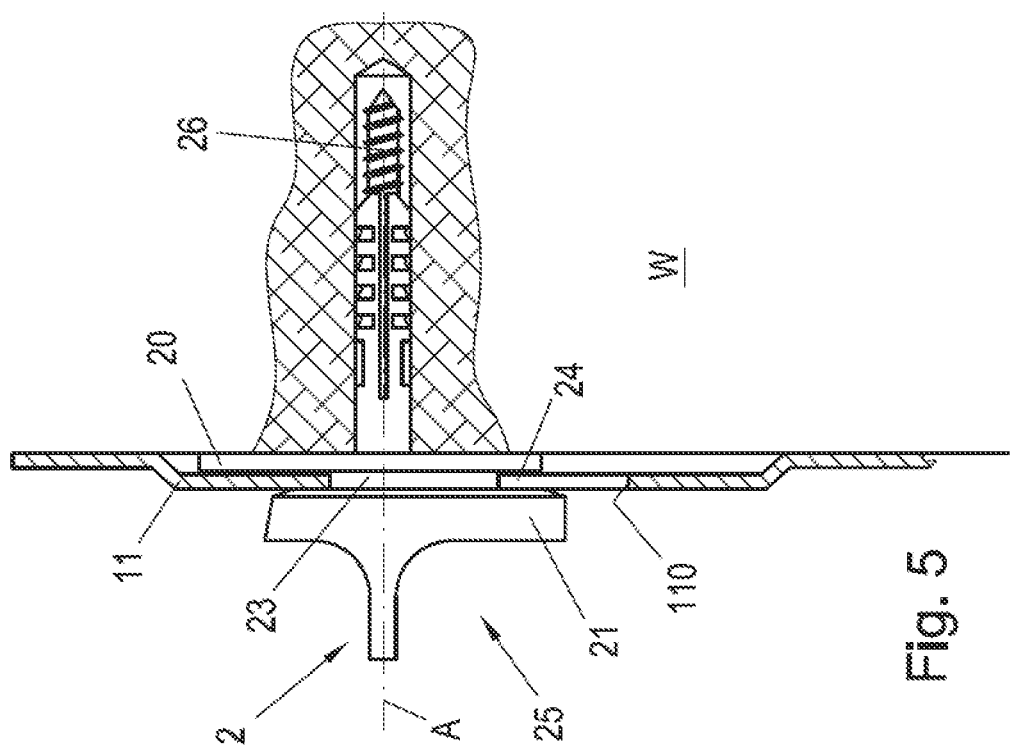
FIG. 5 shows a schematic longitudinal sectional view of the embodiment of the fastening system in FIG. 1.

As shown in FIG. 5, the fastening device 2 is fitted on the wall W. A hole for the fastening element 26 is first drilled in the wall W. The fastening unit 25 then positioned in front of the hole in such a manner that the through opening 22 is aligned with the hole. The fastening element 26, which is preferably a screw, is then passed through the through opening 22 and screwed into the hole in the wall W. In this process the screw is only tightened to such an extent that rotation of the fastening unit 25 about the fastening element 26 is still possible but there is no longer a risk of the fastening unit 25 dropping off. In particular the screw is tightened until the bearing element 20 of the fastening unit 25 rests against the wall W. The fastening unit 25 is then aligned if necessary so that the flattened section 212 of the holding element 21 faces upward. In this position the object is connected to the fastening unit 25. In particular the receiving region 11 is positioned in front of the fastening unit(s) 25 and the receiving openings 110 provided in the receiving region 11 are aligned with the fastening units 25.

As shown in FIG. 6, in a position in which the flattened section 212 faces upward the holding element 21 has a vertical dimension H1 in the vertical direction, which is smaller than the diameter of the circle shape of the holding element 21. The receiving opening 110 in the receiving region 11 preferably also has a height which corresponds to the dimension H1 or is slightly larger than H1. After the holding element 21 has been passed through the receiving opening 110 from the rear, the object on which the receiving region 11 is provided, in particular the housing 10 of the extractor hood 1, can be lowered. This causes the upper edge of the receiving opening 110 to move into the gap 24 formed between the rear face of the holding element 21 and the front face of the bearing element 20. The object can be lowered until the upper edge of the receiving opening 110 comes into contact with the connecting element 23. With the embodiment shown, in which the flattened section 212 of the holding element 21 rests parallel to the initial straight line 231 of the elevation curve 230 on the periphery of the connecting element 23, the upper edge of the receiving opening 110 therefore comes into contact with the initial straight line 231 and rests on said region of the periphery of the connecting element 23.

In this state the object can be displaced parallel to the wall W in order to compensate for a lateral offset. Should one or both sides of the object, in particular of the housing 10 of the extractor hood 1, be too low in this state, the height offset can be compensated for as follows.

Rotating the fastening unit 25, as can be done using the grip elements 211, counterclockwise, brings the upper edge of the receiving opening 110 into contact with the region of the periphery of the connecting element 23 formed by the spiral curve 233. As the distance between the axis A of the through opening 22 and the periphery of the connecting element 23 increases in this region of the elevation curve 230, the object is raised, in other words is displaced vertically upward.

Rotating the fastening unit 25 also moves, in other words twists, the holding element 21 in front of the receiving opening 110. As shown in FIG. 6, the through opening 22 is offset to the right in relation to the center point of the circle of the holding element 21. Rotating the fastening unit 25 counterclockwise therefore rotates the longer part of the base plate 210 downward. The flattened section 212 is also tilted to the left so that the dimension of the holding element 21 in the vertical direction increases. As a result both the upper edge of the receiving opening 110 and the lower edge of the receiving opening 110 are partially covered at the front by the holding element 21. There is therefore no risk of the object dropping or springing out of the gap 24 of the fastening unit 25. When the upper edge of the receiving opening 110 on the elevation curve 230 reaches the final straight line 232 after further rotation of the fastening unit 25, the maximum elevation of the object is achieved. When the fastening unit 25 is rotated further counterclockwise, the upper edge of the receiving opening 110 comes back into contact with the initial straight line 231 and the object is lowered. Rotating the fastening unit 25 from the final straight line 232 or an angular position along the spiral curve 233 clockwise lowers the object.

Once the user has set the desired height of the object by corresponding rotation of the fastening unit 25, said user can tighten up the fastening element 26, in particular the screw. As the screw is being tightened up, the fastening unit 25 can be held firmly at the grip elements 211. This further tightening of the screw presses the bearing element 20 against the wall W and therefore clamps the fastening unit 25 between the screw head and the wall W. Unwanted twisting of the fastening unit is prevented by this clamping force here. Also the highest vertical point of the elevation curve 230 is always perpendicularly above the through opening 22 or at a short horizontal distance therefrom during rotation of the fastening unit 25. When the highest vertical point is offset in relation to the through opening 22, it is to the right of the through opening 22. Because the upper edge of the receiving opening 110 rests on said point and therefore the weight of the object acts at least partially thereon, inherent pressure from the fastening unit 25 can in some instances be generated to produce rotation about the through opening 22. In the case of a screw with a right-hand thread, which is preferably used as a fastening element 26, such inherent pressure be used positively. Certain rotation of the fastening unit 25 about the through opening 22 specifically moves the screw, which is connected to the fastening unit 25 by way of the screw head, clockwise, in other words screws it further in.

The present invention is not restricted to the illustrated embodiment. For example an eccentric with a circular cross section or an oval cross section can also be used as the connecting element. Also the shape of the holding element or bearing element can differ from the shape shown. However it is preferable for the holding element to have a shape that brings about a change in the vertical dimension of the holding element during rotation about the through opening.

The present invention therefore provides a solution for bringing about the fastening of an object, in particular the housing of an extractor hood, to a wall with the option of aligning the object without tools in a simple and reliable manner. In particular it is possible to compensate for height and lateral offsets.

In this process, when fastening an object, in particular an extractor hood, to a wall, the object can be aligned with the minimum possible effort. With the inventive fastening unit the front outer dimension, in particular of the holding element, preferably increases in the vertical direction as a result of twisting and the object, in particular the hood, can no longer slip out of the fastening position.

As well as having a simple structure and being easy to handle, the present invention has further advantages. In particular the fastening unit can be produced at low cost. Problems due to fluctuations in material quality are virtually excluded. The number of elements in the fastening device can be limited to two, specifically the fastening unit and a fastening element in the form of a screw. This reduces the diversity of parts and simplifies storage. Finally the present invention allows reliable securing to be achieved while the object is being fastened and after it has been fastened.

LIST OF REFERENCE CHARACTERS

1 Extractor hood
10 Housing
11 Receiving region
110 Receiving opening
2 Fastening device
20 Bearing element
21 Holding element
210 Base plate
211 Grip element
212 Flattened section
22 Through opening
23 Connecting element
230 Elevation curve
231 Initial straight line
232 Final straight line
233 Spiral curve
24 Gap
25 Fastening unit
26 Fastening element
27 Fastening system
A Axis of through opening
W Wall
H Height dimension of holding element

The invention claimed is:

1. A fastening device for fastening an object to a wall of an occupiable building space, the fastening device comprising:
a fastening element; and
a single-piece fastening unit, the fastening unit having:
a bearing element adapted for bearing a portion of a weight of the object against the wall of the occupiable building space and having a rear face that is configured to contact the wall of the occupiable building space,
a holding element configured to hold at least a part of the object against the bearing element,
a connecting element constructed as an eccentric and disposed between the bearing element and the holding element, and
an opening for the fastening element, the opening extending through the holding element, the connecting element, and the bearing element to allow passage of the fastening element through the fastening unit and into the wall of the occupiable building space, the holding element extending, at every location, farther radially from an axis of the opening than the connecting element extends radially from the axis of the opening,
wherein the bearing element is fixed to the connecting element such that the bearing element and the connecting element cannot move relative to each other, and the bearing element extends, at every location, farther radially from the axis of the opening than the connecting element extends radially from the axis of the opening, and
the fastening element is configured to fasten the fastening unit to the wall of the occupiable building space.

2. The fastening device of claim 1, wherein the bearing element and the holding element define in a region of the connecting element a circumferential gap there between to receive a part of the object.

3. The fastening device of claim 1, wherein the eccentric is a spiral eccentric.

4. The fastening device of claim 3, wherein the bearing element and the holding element define in a region of the connecting element a circumferential gap there between to receive a part of the object.

5. The fastening device of claim 1, wherein the connecting element is shaped as a spiral eccentric with a highest point of the eccentric disposed above the opening.

6. The fastening device of claim 5, wherein the bearing element and the holding element define in a region of the connecting element a circumferential gap there between to receive a part of the object.

7. The fastening device of claim 1, wherein the holding element has a shape defined by a vertical dimension which is smaller in one angular position than in any other angular position of the holding element in relation to the through opening.

8. The fastening device of claim 7, wherein the bearing element and the holding element define in a region of the connecting element a circumferential gap there between to receive a part of the object.

9. The fastening device of claim 1, further comprising at least one grip element projecting outward from the holding element.

10. The fastening system of claim 9, wherein the at least one grip element is embodied as a set of wings.

11. A fastening system, comprising:
a fastening device for fastening an object to a wall of an occupiable building space, the fastening device including:
a fastening element, and
a single-piece fastening unit, the fastening unit having:
a bearing element adapted for bearing a portion of a weight of the object against the wall of the occupiable building space and having a rear face that is configured to contact the wall of the occupiable building space,
a holding element configured to hold at least a part of the object against the bearing element, a connecting element constructed as an eccentric and disposed between the bearing element and the holding element, and an opening for the fastening element, the opening extending through the holding element, the connecting element, and the bearing element to allow passage of the fastening element through the fastening unit and into the wall of the occupiable building space, the holding element extending, at every location, farther radially from an axis of the opening than the connecting element extends radially from the axis of the opening; and a receiving region on the object, said receiving region including at least one receiving opening for receiving at least a part of the fastening device, wherein the bearing element is fixed to the connecting element such that the bearing element and the connecting element cannot move relative to each other, and the bearing element extends, at every location, farther radially from the axis of the opening than the connecting element extends radially from the axis of the opening, and the fastening element is configured to fasten the fastening unit to the wall of the occupiable building space.

12. The fastening system of claim 11, wherein the eccentric is a spiral eccentric.

13. The fastening system of claim 11, wherein the holding element of the fastening device has a vertical dimension which corresponds to a height of the receiving opening of the receiving region in one angular position of the fastening unit and which is greater than the height of the receiving opening in all other angular positions.

14. The fastening system of claim 13, wherein the bearing element and the holding element define in a region of the connecting element a circumferential gap there between to receive a part of the object.

15. The fastening system of claim 11, wherein the receiving region is part of an extractor hood.

16. The fastening system of claim 15, wherein the receiving region is part of a rear wall of a housing of the extractor hood.

17. The fastening system of claim 11, wherein the bearing element and the holding element define in a region of the connecting element a circumferential gap there between to receive a part of the object.

18. The fastening system of claim 17, wherein the eccentric is a spiral eccentric.

* * * * *